Jan. 8, 1952  E. L. SNYDER  2,581,975
ELECTRIC TOASTER
Filed March 18, 1947  3 Sheets-Sheet 1

INVENTOR.
Eugene L. Snyder
BY
Harry S. Dumarse
ATTORNEY.

Jan. 8, 1952   E. L. SNYDER   2,581,975
ELECTRIC TOASTER
Filed March 18, 1947   3 Sheets-Sheet 3

INVENTOR.
Eugene L. Snyder
BY Harry S. Dumass
ATTORNEY.

Patented Jan. 8, 1952

2,581,975

UNITED STATES PATENT OFFICE 2,581,975

ELECTRIC TOASTER

Eugene L. Snyder, Canton, Ohio, assignor to The Hoover Company, North Canton, Ohio, a corporation of Ohio Application March 18, 1947, Serial No. 735,292

8 Claims. (Cl. 99—329)

The present invention relates to electric bread toasters and more particularly to a thermal timing mechanism for timing the duration of the toasting interval whereby the operator may obtain toast cooked exactly as he or she desires.

More particularly this invention relates to a timing mechanism for a toaster in which the operator may adjust for toasting ordinary soft toast to a dark, medium or light degree or the operator may have so-called "melba" or dry toast also cooked dark, medium or light.

According to this invention the thermal timing element for the browning operation is heated and then cooled to perform the timing function. An auxiliary heater is provided for the thermal element which is energized simultaneously with the main heaters. When the thermal element reaches a predetermined temperature it acts to deenergize the auxiliary heater while the main heaters remain energized. The thermally responsive element is then permitted to cool and when it reaches a predetermined lower temperature it operates to deenergize the main heaters and release the toast carriage for upward movement to toast ejecting position.

In order to adjust for light, medium or dark toast, the auxiliary heater is movable toward and away from the thermally responsive element so as to vary the time it takes the thermally responsive element to reach its predetermined higher temperature. The time it takes the thermally responsive element to cool from its predetermined high temperature to its predetermined low temperature will remain substantially the same regardless of the setting of the adjusting mechanism. Thus the browning interval is varied solely by varying the heating up period of the thermally responsive element.

A reflector is provided for reflecting heat from the auxiliary heater to the thermally responsive element which moves toward and away from the thermally responsive element with the auxiliary heater as the auxiliary heater is moved toward and away from the thermally responsive element in adjusting the timer for light, medium or dark toast.

A resistance is selectively connected in series with the main heaters at the will of the operator so that the main heaters merely become slightly hot in order to dry the toast before the actual browning operation begins. The drying operation is adjustable by means of a rheostat whereby more or less resistance may be manually connected in series with a thermostat timing element to thus vary the time of the drying operation. The drying operation is also timed and when a predetermined drying time has elapsed the timer automatically returns to the normal toasting or browning operation without any attention from the operator. During the drying operation the auxiliary heater for the main timer is deenergized.

According to another feature of this invention partitions are provided dividing the toaster into a central toasting chamber, front and rear mechanism compartments at the ends and a bottom mechanism compartment. A latch is provided in the front mechanism compartment for holding the carriage in toasting position. A thermal timer is positioned in the rear mechanism compartment for timing the duration of the browning interval and a motion transmitting member is positioned in the bottom of the compartment for transmitting motion from the timer to the latch for releasing the same.

The auxiliary drying heater, the variable resistor, the drying timer and the necessary switch mechanism is also positioned in the rear mechanism compartment and an adjusting rod extends from a manually manipulatable knob on the outside of the toaster through the bottom mechanism compartment to the variable resistor whereby the crisping control may be adjusted to vary the drying action of the toaster.

Other objects and advantages of this invention will become apparent as the description proceeds when taken in connection with the accompanying drawings, in which.

The browning control as such forms no part of the present invention except in combination with the crisping control. The browning control as such is disclosed and claimed in an application of Eugene L. Snyder and Warren A. Humphrey, Ser. No. 725,556, filed January 31, 1947.

Figure 1:
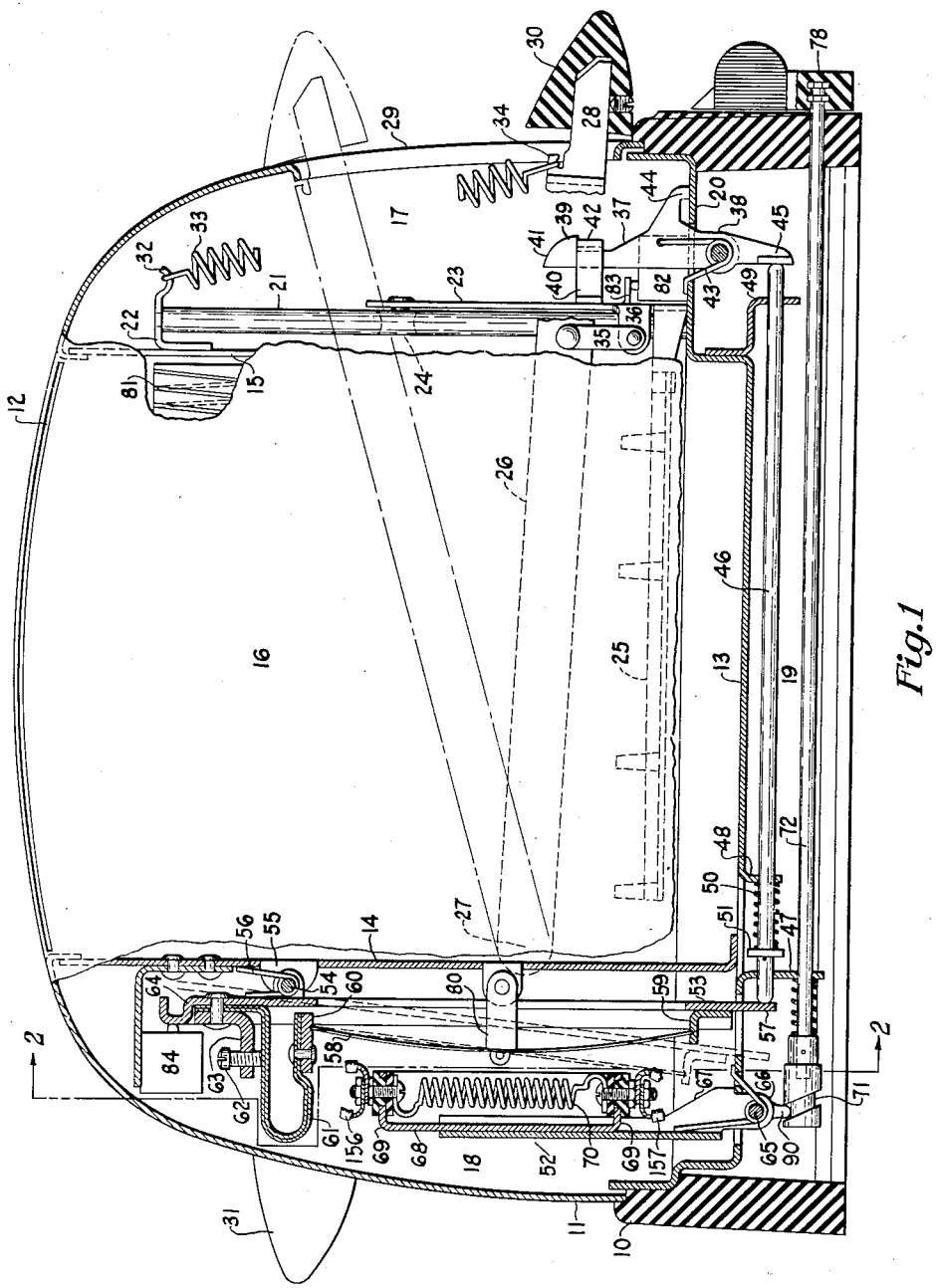
Figure 1 is a cross sectional view of a toaster showing the details of the main timing control for the browning operation.

Referring to Figure 1 of the drawings, the toaster is provided with the plastic base 10 having a cover or appearance housing 11 mounted thereon to cover both the mechanism and toasting compartments. The appearance housing 11 is provided with two toast receiving openings 12, shown in Figure 2.

A base plate 13 is mounted on the base 10 and forms a support for the entire mechanism within the appearance housing 11.

Partitions 14 and 15 divide the toaster into toasting chamber 16, front mechanism compartment 17 and rear mechanism compartment 18. The base plate 13 separates the toasting chamber 16 from a lower mechanism compartment 19.

Rigidly mounted upon an upwardly extending portion 20 of the base plate 13 are a pair of guide posts 21, one of which is shown in Figure 1, which are rigidly attached to the partition 15 by means of a bracket 22. The guide posts 21 form guides for a vertically reciprocating supporting plate 23 by means of a plurality of rollers 24 as is well known in the art.

Rigidly attached to the bottom end of the supporting plate 23 are a pair of bread carriers 25, one of which is shown in Figure 1. In order to manually reciprocate the supporting plate 23 and the bread carriers 25 in an upward and downward direction, a U-shaped lever is provided, one arm 26 of which is shown in Figure 1. At their rear ends the arms 26 are pivoted to the toaster chamber walls as shown at 27 and at the front end are extended forwardly as at 28 so as to extend through a slot 29 in the appearance housing 11. Secured to the extending portion 28 of the arms 26 is a manipulating handle 30 by which the toast carriers 25 may be moved downwardly to toasting position. At the opposite end of the toaster from the manipulating handle 30 is a second handle 31 secured to the appearance housing 11. The handles 30 and 31 may be utilized for carrying the toaster from place to place.

The bracket 22 is extended forwardly to form a hook 32 which forms the upper anchorage for tension spring 33 which is secured at its lower end to a hook 34 on the extending portions 28 of the arms 26. The arms 26 are secured to the supporting plate 23 by means of links 35, pivoted at their upper ends to the arms 26 and at their lower ends to lugs 36 which are bent backwardly from the supporting plate 23.

Normally the tension spring 33 spring-biases the arms 26 to their upward position and accordingly also spring-biases the bread carriers 25 and the supporting plate 23 to their upward position.

In order to hold the bread carriers 25 in their lower toasting position a latch 37 is pivoted to lugs 38 struck downwardly from the portion 20 of the base plate 13. At its upper end the latch 37 has a hook 39 which cooperates with a U-shaped member 40 extending forwardly from the supporting plate 23 for holding the supporting plate 23 in downward position. The latch is provided with cam surface 41 which cooperates with the portion 42 of the lug 40 to move the latch 37 counter-clockwise against the bias of the spring 43 when the supporting plate 23 is moved to downward position. When the hook 39 passes the portion 42 of the lug 40 the spring 43 projects the hook 39 above the portion 42 of the lug 40. In order to hold the latch 32 in a position so that the cam surface 41 will cooperate with the lug 42 a supporting foot 44 is provided which will contact the plate 20 to hold the latch 37 in a substantially vertical position.

Below its pivot the latch 37 is provided with an impact end 45 which cooperates with a reciprocating rod 46 mounted upon the bottom plate 13 by means of lugs 47, 48 and 49 so as to lie in the bottom mechanism compartment 19. A spring 50 coacts with a collar 51 and the projection 48 to normally spring-bias the actuating rod 46 toward the left so as to be out-of-contact with the impact end 45 of the latch 37 unless positively held against the end 45.

The main browning timing mechanism generally indicated by the reference numeral 52, comprises a frame 53 pivotally mounted at 54 upon lugs 55 struck rearwardly from the partition 14. A spring 56 biases the frame 53 so that its impact end 57 presses against the left hand end of the rod 46 to hold the front end of the rod 46 against the impact end 45 of the latch 37 in opposition to the bias of the spring 50 but with insufficient force to overcome the force of the spring 43 and the frictional force holding the latch 37 in latching position.

A bimetallic strip 58 is supported at its ends between the abutment 59 at the lower end of the frame and an abutment 60 near its pivot point 54. The abutment 60 is mounted on the end of a U-shaped bimetallic strip 61 secured to the frame 53 by a rivet or other suitable securing means. A screw 62 is threaded through a bracket 63 secured to the upper end 64 of the frame 53, and is adapted to be adjusted to apply more or less pressure to the end of the bimetallic strip 58 and constitutes a factory adjustment. The purpose of the U-shaped bimetal 61 will be described in more detail hereinafter.

The central portion of the bimetallic strip 58 is secured to the partition 14 by means of a link 60 so that the central portion of the bimetallic strip 58 is substantially immovable relative to the pivot point 54 of the frame 53.

Pivotally mounted at 65 on lugs 66 pressed downwardly from the base plate 13 is a bracket 67 which carries a reflector 68. The ends of the reflector 68 are turned forwardly as shown at 69 and support an auxiliary heating coil 70. The bracket 67, the reflector 68 and heating coil 70 will normally lie in substantially parallel relationship to the bimetallic strip 58 and are adapted to be moved toward and away from the bimetallic strip 58 by means of a spiral cam 71 cooperating with a lug 90 on the lower end of the bracket 67. The cam 71 is mounted on the end of rod 72 extending through the lower mechanism compartment 19 and through the base 10. On the outside of the base 10 is a manipulating knob 78 attached to the rod 72 for manual rotation thereof.

Heating elements 81 are spaced on each side of the toast racks 25 within the toasting chamber 16. The main switch 82 is closed by lug 83, struck forwardly from the support 23 when the support 23 and the carriers 25 are moved to toasting position so as to energize the main heaters 81. The switch 82 opens automatically when the lug 83 is raised.

An auxiliary switch 84 is closed to energize the auxiliary heater 70 by the end 64 of the frame 53 when in the position shown in Figure 1. When the end 64 moves to the right or in a clockwise direction as viewed in Figure 1, the switch 84 will open automatically to deenergize the auxiliary heater 70.

Figure 2:
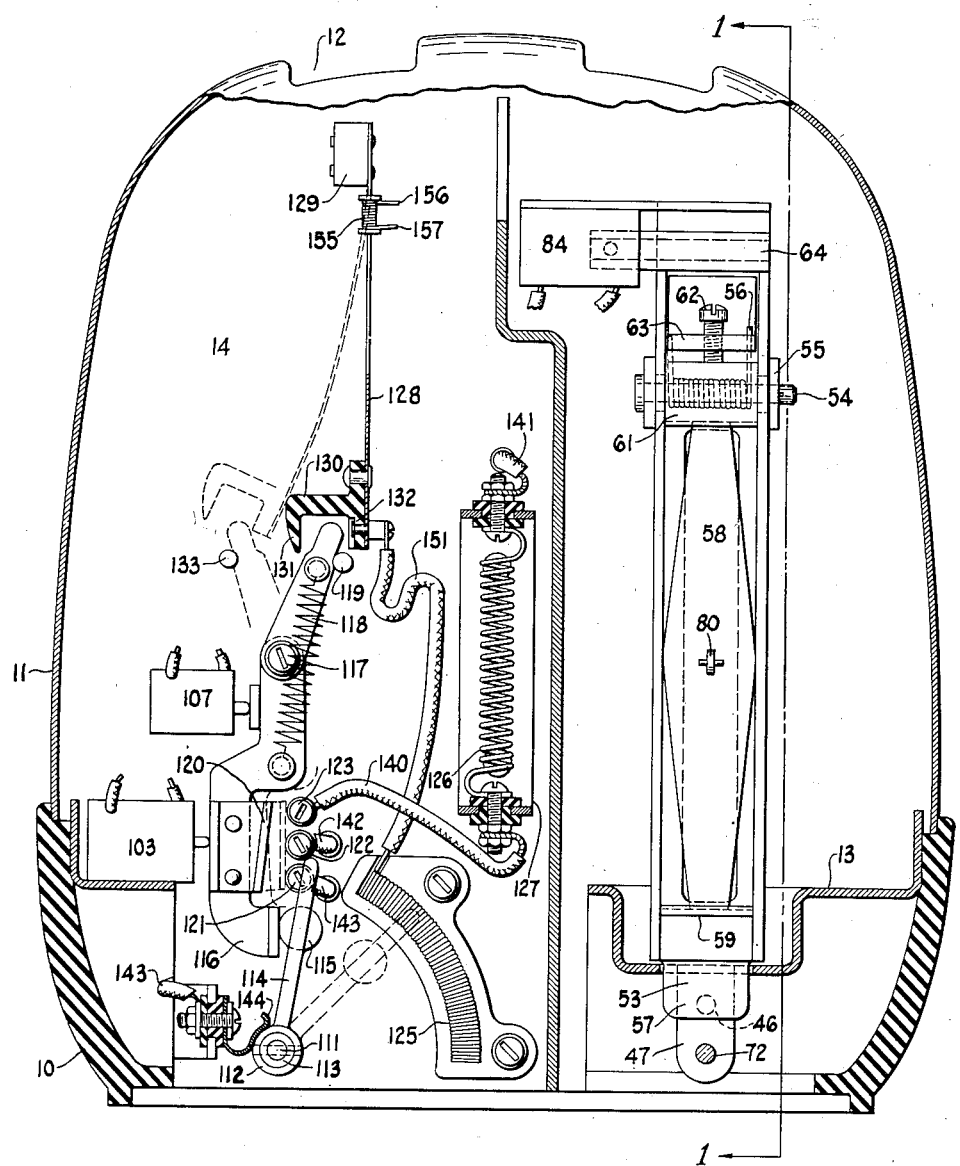
Figure 2 is a transverse cross sectional view through the rear mechanism compartment showing details of the control according to this invention.
Figure 4:
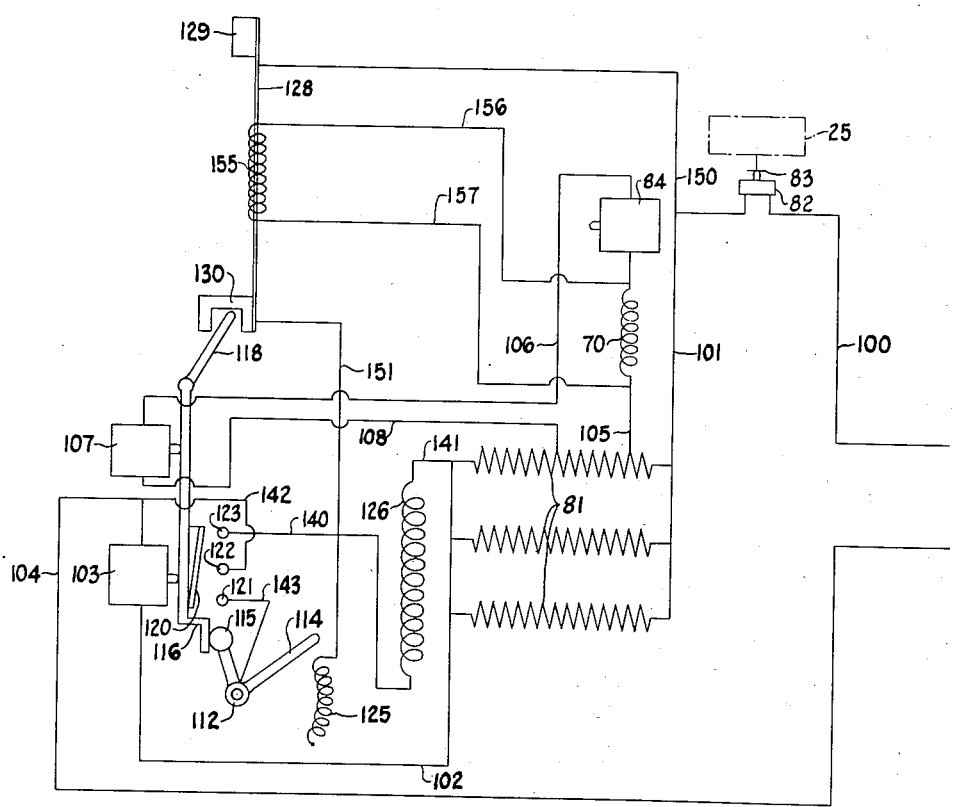
Figure 4 is a wiring diagram showing how the various parts are electrically connected.

In the position shown in Figure 2 of the drawings the crisper control is out of circuit and the toaster is solely under the control of the browning control 52. Referring to Figure 4, with the carriers 25 in downward position the lug 83 will close the main switch 82. Current will then flow from one side of the power line through the conductor 100, closed switch 82, conductor 101, heaters 81, conductor 102, closed switch 103 and conductor 104 back to the other side of the power line. At the start of the browning operation the secondary heater 70 will also be energized through the conductor 100, switch 82, conductor 101, conductor 105, heater 70, closed switch 84, conductor 106, closed switch 107, conductor 108, conductor 102, closed switch 103 and conductor 104 back to the other side of the power line.

The coil 70 will cause the bimetal 58 to warp and open the switch 84 whereby the bimetal 58 will cool and open the switch 82 as will be later described in detail.

Figure 3:
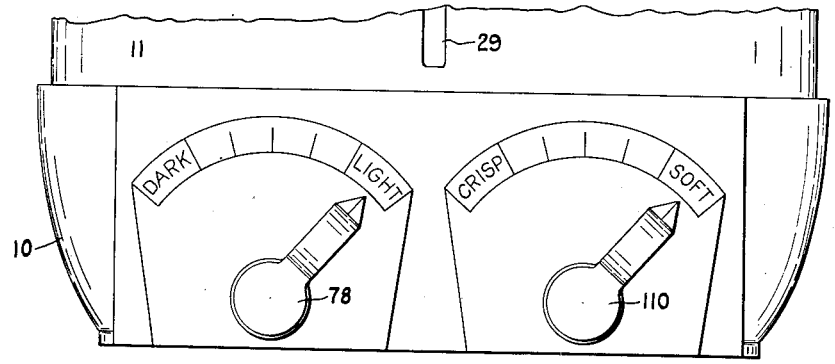
Figure 3 is a front view of the base of the toaster showing a manual control knob for both the browning and crisping control.

The manual lever 110 is movable counterclockwise from the position shown in Figure 3 to bring the crisper control into operation. The lever 110 is rigidly attached to a shaft 111 which extends through the bottom mechanism compartment 19 to the rear mechanism compartment 18 where a sleeve 112 is rigidly attached thereto by insulating bushing 113.

Attached to the sleeve 112 are arms 114 and 115. Movement of the manual lever 110 counter-clockwise as viewed in Figure 3 will move the arms 114 and 115 clockwise as viewed in Figure 2. This movement will cause the arm 115 to move out-of-contact with the arm 116 forming part of a toggle mechanism, including a toggle spring 117 and an arm 118.

In the position shown in Figure 2 the arm 118 rests against a stop 119 so that the spring 117 biases the arm 116 to move counter-clockwise as viewed in Figure 2. Movement of the arm 115 away from the arm 116 will permit it to move counter-clockwise as viewed in Figures 2 and 4 and open the switches 103 and 107. At the same time bridging contact 120 carried by the arm 116 will come into contact with spaced contacts 121, 122 and 123 and the arm 114 will assume the dotted line position of Figure 2 so that its end will contact the variable resistor 125 mounted upon the partition 14. A resistance wire 126 is also mounted on the partition 14 by means of a bracket 127.

A bimetallic thermostat 128 having a high resistance is also mounted on the partition 14 by means of a bracket 129 so that its upward end is fixed and its lower end free to move. At its lower end the bimetal thermostat 128 carries a member 130 having spaced lugs 131 and 132 which coact with the arm 118 of the toggle mechanism to snap the toggle arm 118 to the left as viewed in Figure 2 against the stop 133 under certain conditions. A small resistance coil 155 is wrapped about bimetal 128. The opposite ends of coil 155 are connected to the opposite ends of heater 70 by conductors 156 and 157 so as to be connected in parallel therewith.

Contact 123 is connected by conductor 140 to one end of the resistance coil 126, the opposite end of which is connected by conductor 141 to the main heaters 81. The contact 122 is connected by conductor 142 to the conductor 104 leading to one side of the power line. The contact 121 is connected by conductor 143 to the sleeve 112 through contact member 144 which has a sliding contact with the sleeve 112.

The bimetal thermostat 128 is connected at its upper end to the main switch 82 by conductor 150 and at its lower end is connected to the variable resistor 125 by the conductor 151.

The arm 114 by movement of the lever 110 may be moved just into contact with the upper end of the variable resistor 125, it may be moved to the lower end of the variable resistor 125 or to any point therebetween. In any event, movement of the arm 114 into contact with the variable resistor 125 will cut out the normal browning control and bring the crisping control into operation.

With the crisper control in operation and the carriers 25 moved to toasting position, the switch 107 being opened, the secondary heater 70 of the browning control 52 and the resistance coil 155 will be out of circuit. A circuit will be established from one side of the power line by conductor 100, switch 82, conductor 150, bimetal 128, conductor 151, arm 114, sleeve 112, contact 144, conductor 143, contact 121, bridging contact 120, contact 122, conductor 142 and conductor 104 to the other side of the power line. Another circuit will be established from one side of the power line by conductor 100, switch 82, conductor 101, main heaters 81, conductor 141, resistance coil 126, conductor 140, contact 123, bridging contact 120, contact 122, conductor 142 and conductor 104 to the other side of the power line. More or less of the variable resistance 125 will be inserted into the former circuit depending upon the distance the lever 110 is moved.

*Operation*

With the lever 110 moved to a counter-clockwise position from that shown in Figure 3 the main browning control 52 will be inoperative. When the carriers 25 are moved to toasting position the resistance 126 being connected in series with the main heaters 81, the main heaters 81 will develop only a small amount of heat and operate at a comparatively low temperature insufficient to brown the bread but sufficient to dry it gradually. The bimetal 128 which is also a resistance being connected in circuit will gradually heat up and warp to the left towards its dotted line position of Figure 2. Depending upon the setting of the lever 110 and correspondingly the arm 114, the bimetal 128 will be heated quickly or slowly. If none of the variable resistance 125 is in series with the bimetal 128 the bimetal 128 will heat quite rapidly. However, if more or less of the variable resistance 125 is connected in series with the bimetal 128 by movement of the arm 114 clockwise as viewed in Figure 2, the bimetal 128 will heat more slowly and the crisping time will be correspondingly increased.

Heating of the bimetal 128 will eventually cause it to warp sufficiently causing the lug 132 to contact the arm 118 of the toggle mechanism and move its upper end to the left as viewed in Figure 2. The bimetal 128 will continue to warp to the left until the arm 118 moves past its dead center position with relation to the arm 116 at which time the spring 117 will snap the arm 116 to the left as viewed in Figure 2. This action will cause the bridging contact 120 to move away from the contacts 121, 122 and 123 and close the switches 103 and 107.

That will open the circuits previously described to deenergize the variable resistance 125, the resistance coil 126 and the bimetal 128. At the same time the main heaters will remain energized by way of conductor 100, switch 82, conductor 101, heaters 81, conductor 102, closed switch 103 and conductor 104.

The secondary heater 70 will also be energized the circuit being conductor 100, switch 82, conductor 101, conductor 105, switch 84, conductor 106, closed switch 107, conductor 108, conductor 102, closed switch 103 and conductor 104. The resistance coil 155 being connected in parallel with the heater will also be energized by way of conductors 156 and 157. The browning operation will then begin.

Assume that the operator has set the browning control knob 78 for dark toast.

Heat which is radiated directly from the heater 70 to the bimetallic strip 58 as well as reflected thereto by the reflector 68 will gradually increase the temperature of the bimetallic strip 58 so that it will tend to straighen out. Since the central portion of the strip 58 is substantially fixed by the link 89 relative to the pivot 54, the straightening out of the bimetallic strip 58 will cause the frame 53 to move gradually in a clockwise direction as viewed in Figure 1. This will cause its impact end 57 to move to the left and will also permit the rod 46 to move to the left under the bias of the spring 50 until the bimetallic strip assumes a substantially straight position when it will snap across its dead center position to the dotted line position shown in Figure 1 so as to move the impact end 57 of the frame 53 out-of-contact with the end of the rod 46.

Since the bimetallic strip 61 was also cold at the start of this toasting operation, it will apply a small compressive force to the end of the bimetallic strip 58 so that less heat will be necessary to move the bimetallic strip 58 past its dead center position than would be the case if the entire timer was warm at the start of the toasting interval.

During his time heat generated by the resistance coil 155 will cause the bimetal 128 to remain in its dotted line position so as to prevent it from moving the arm 118 to a position where the arm 116 will snap to its opposite position and open switches 103 and 107 before the bimetal 58 snaps frame 53 to its dotted line position of Figure 1.

Movement of the frame 53 past its dead center position to the position shown in dotted lines in Figure 1 will cause the end 64 to move away from the switch 84 so that the switch 84 automatically opens and deenergizes the auxiliary heater 70 and the resistance coil 155 so as to permit the bimetallic strips 58 and 128 to cool.

As the bimetallic strip 58 cools it will again tend to straighten from the dotted line position shown in Figure 1 so as to move the frame 53 in a counter-clockwise direction. This will continue until the frame 53 moves back to its dead center position at which time the combined action of the bimetallic strip 58 and the spring 56 will quickly snap to bring frame 53 to its full line position as shown in Figure 1. This will cause the impact end 57 to contact the end of the rod 46 with a soft of hammer blow forcing the rod to the right. The right hand end of the rod 46 will contact the impact end 45 of the latch 37 also with the hammer blow of sufficient force to move the latch 37 counter-clockwise as viewed in Figure 1 and move the hook 39 away from above the portion 42 of the lug 40. This will permit the spring 33 to move the support 23 and the carriers 25 to their upper toast ejecting position. This will cause the lug 83 to move out of contact with the switch 82 which will automatically open and deenergize the main heaters 81 to end the toasting interval.

When the portion 42 of the lug 40 clears the hook 39 of the latch 37 the spring 43 will move the latch 37 clockwise as viewed in Figure 1 to the position shown in Figure 1 where the stop 44 is in contact with the end 20 of the base plate 13. The rod 46 will move to the left under the bias of the spring 50 and accordingly move the frame 53 slightly to the left to the position shown in Figure 1 against the force of the spring 56 placing the mechanism in condition for the next succeeding toasting operation.

Since the bimetallic strip 58 was cooled to a predetermined low temperature before the toasting period was ended it will be in a fairly cool position ready for the next succeeding toasting operation even though the crisping control is not placed in operation. It has been found that thermal timers have a tendency to overcompensate due to the heat stored in them but since the bimetallic strip 61 is also hotter than when the toaster is operated from cold condition it will apply more compressive force to the end of the bimetallic strip 58 so that more heat must be supplied to the bimetallic strip 58 to cause the frame 53 to pass its dead center position than would be the case when the toaster is operated from its cold condition.

While the bimetal 58 is cooling the bimetal 128 being deenergized will also cool and move to the right as viewed in Figure 2. The lug 131 will contact the lever 118 of the toggle mechanism and move it to the right until the toggle mechanism moves past its dead center position so that the spring 117 snaps the arm 118 and the arm 116 to the right as viewed in Figure 2.

Before the next operation the bimetal 128 will have cooled so as to properly time the next crisping operation. If the arm 116 is moved to soft position, however, the arm 116 will again be moved back to the position shown in Figure 2 and the crisper control will be rendered inoperative.

In any event the respective thermostatic controls either for browning or crisping will always be in proper position and condition to control the succeeding operation regardless of the control setting.

If the arm 110 was originally set for soft toast the crisper control will be cut out of the circuit and the browning control will proceed as previously described immediately the toast carriers 25 are moved to toasting position while the resistance coil 155 will also be energized when the browning control alone is used and move the bimetal 128 to the dotted line position of Fig. 2. This can do no harm because the arm 116 is locked in its Fig. 2 position by the arm 115, so as to hold the switches 103 and 107 in closed position.

From the foregoing it can be seen that this invention provides a toaster so controlled that the operator may have soft toast browned to any degree of browness or crisp toast dried to any degree of crispness and also browned to any degree of browness.

While I have shown but a single embodiment of my invention it is to be understood that this embodiment is to be taken as illustrative only and not in a limiting sense. I do not wish to be limited to the particular structure shown and described but to include all equivalent variations thereof except as limited by the scope of the claims.

I claim:

1. A toaster comprising, bread carriers, means for moving said carriers to toasting position, main heaters, a fixed electrical resistance, a control for energizing said main heaters in series with said resistance when said carriers are moved to toasting position, said control including a current responsive thermostatic timer and a variable resistance connected in series therewith, said current responsive timer and variable resistance being connected in parallel with said main heaters and fixed resistance and manual means for varying the resistance of said variable resistance to vary the time of the toasting interval, said timer being operative after an interval to deenergize said fixed resistance to operate said main heaters at high heat and timing means operative after a second interval for deenergizing said main heaters said current responsive timer being operable to activate said timing means simultaneously with the deenergization of said fixed resistance.

2. A toaster comprising; partitions dividing said toaster into a toasting chamber, a front mechanism compartment, a rear mechanism compartment and a bottom mechanism compartment; bread carriers in said toasting chamber movable from an upper bread receiving position to a lower toasting position, heating means in said toasting chamber, means in said front mechanism compartment for latching said carriers in toasting position, a fixed resistance in said rear mechanism compartment; a crisper control and a browning control in said rear mechanism compartment; a pair of manually operable knobs mounted on the front of said toaster for adjusting said crisping control and said browning control; connecting means extending through said bottom mechanism compartment and operatively connecting said knobs to said controls; one of said knobs being operable to a position to render said crisping control inoperative, switch means connected in circuit with said heating means and said resistance positioned to be actuated by said crisper control for energizing said heating means in series with said resistance when said carriers are moved to toasting position, said switch means positioned to be actuated by said browning control for energizing said heating means alone when said carriers are moved to toasting position, said crisper control being operable to simultaneously deenergize said resistance and activate said browning control at the end of its controlling operation.

3. A toaster comprising; a crisping timer and a browning timer operable sequentially to time a crisping interval followed by a browning interval; said browning timer including a thermally responsive element movable to one position and back to its original position when cooled, a heater therefor, means for energizing said heater to cause said thermally responsive element to move to said one position, means operative by movement of said thermally responsive element to said one position for deenergizing said heater to cause said thermally responsive element to cool and move to its original position, and means operable by movement of said thermally responsive element to its original position for terminating said browning interval; said crisping timer including a current responsive bimetal movable to one position when heated by the passage of current therethrough and back to its original position when cooled; means actuated by movement of said current responsive bimetal to said one position to terminate the crisping interval, initiate the browning interval and deenergize said current responsive bimetal; means rendered operative by operation of said browning timer heater to maintain said current responsive bimetal in its said one position during operation of said browning timer heater and means actuated by movement of said current responsive element to its original position for conditioning said crisping control for a succeeding operation.

4. A toaster timer comprising, a crisping timer and a browning timer operable sequentially to produce a crisping interval followed by a browning interval, said crisping timer including a first temperature responsive element having a hot position and a cold position, said browning timer including a second thermally responsive element having a hot position and a cold position and an auxiliary heater therefor, means for heating said first thermally responsive element whenever said auxiliary heater is operative, means for initiating a crisping interval by supplying heat to said first thermally responsive element to cause it to move from its cold position to its hot position, means operable by movement of said first thermally responsive element to its hot position for terminating the crisping interval and initiating the browning interval by supplying heat to said first thermally responsive element from said first heating means and energizing said auxiliary heater to cause said second thermally responsive element to move from its cold position to its hot position and said first thermally responsive element to remain in its hot position, means actuated by movement of said second thermally responsive elements to its hot position for deenergizing said auxiliary heater discontinuing the supply of heat to said first thermally responsive element to permit both of said thermally responsive elements to cool and move toward their cold position, means actuated by movement of said first thermally responsive element to its cold position for conditioning sadi crisping timer for a succeeding operation and means operated by movement of said second thermally responsive element to its cold position for terminating the browning interval.

5. A toaster comprising, toast carriers, means for moving said carriers to toasting position, heaters for performing the toasting function, timing means including a first thermally responsive element and a second thermally responsive element, each of said thermally responsive elements having a hot position and a cold position, means actauted by movement of said carriers to toasting position for operating said heaters at a low temperature and for supplying heat to said first thermally responsive element to cause it to move from its cold position to its hot position, means actuated by movement of said first thermally responsive element to its hot position for operating said heaters at a high temperature, for continuing the supply of heat to said first thermally responsive element to prevent its return to its cold position and supplying heat to said second thermally responsive element to cause it to move to its hot position, means operated by movement of said second thermally responsive element to its hot position for discontinuing the supply of heat to both of said thermally responsive elements to permit them to cool and move to their cold positions, means actuated by movement of said second thermally responsive element to its cold position for deenergizing said heaters and means operable by movement of said first thermally responsive element to its cold position for conditioning said timing means for a succeeding operation.

6. In a toaster, main heaters for performing the toasting function, bread carriers movable from a bread receiving to a toasting position adjacent said heaters and spring-biased to bread receiving position, a latch for holding said carriers in toasting position, timing mechanism for releasing said latch at the end of each toasting interval, said timing mechanism including an electrically operated crisping timer and an electrically operated browning timer, switch means actuated to closed position by movement of said carriers to toasting position and second switch means manually actuatable to selectively energize said browning timer and heaters alone or to serially energize said crisping and browning timers and said heaters, said crisping timer being operable to actuate said second switch means to deenergize said crisping timer and energize said browning timer at the end of its timing interval and said browning timer being operable to deenergize said heaters and said browning timer and to release said latch at the end of its timing interval.

7. In a toaster, main heaters for performing the toasting function, bread carriers movable from a bread receiving to a toasting position adjacent said heaters and spring-biased to bread receiving position, a latch for holding said carriers in toasting position, timing mechanism for releasing said latch at the end of each toasting interval, an auxiliary resistance, said timing mechanism including an electrically operated crisping timer and an electrically operated browning timer, switch means actuated to closed position by movement of said carriers to toasting position and second manually actuatable switch means selectively operable to energize said browning timer and said main heaters or to serially energize said crisping and browning timers and said auxiliary resistance and main heaters in series, said crisping timer being operable at the end of its timing interval to actuate said switch means to deenergize said crisping timer and said auxiliary resistance and to energize said browning timer, said browning timer being operable at the end of its timing interval to release said latch and to deenergize said main heaters and said browning timer.

8. A toaster comprising, bread carriers, means for moving said bread carriers to toasting position, latch means for holding said carriers in toasting position, main heaters, an auxiliary resistance selectively connectable in series circuit with said heaters to reduce the heating effect thereof, control means connected in circuit with said heaters and auxiliary resistance, said control means including first and second timers selectively operable to operate sequentially in timing a toasting operation or to time a toasting operation by the operation of said second timer alone, manually settable means movable to a first position to render said timers sequentially operable upon initiation of a toasting operation and to a second position to render said second timer alone operative upon initiation of a toasting operation, said control means including switch means operable to connect said heaters and auxiliary resistance in series circuit upon movement of said carriers to toasting position when said manually settable means is in said first position and to energize said heaters alone upon movement of said carriers to toasting position when said manually settable means is in said second position, said first timer being operable after a first interval to actuate said switch means to cut said auxiliary resistance out of circuit and to initiate operation of said second timer when said timers are set to operate sequentially and said second timer being operable after a second interval to release said latch means and to actuate said switch means to deenergize said heaters.

EUGENE L. SNYDER.

REFERENCES CITED

The following references are of record in the file of this patent:

UNITED STATES PATENTS

| Number | Name | Date |
|---|---|---|
| 2,070,128 | Ireland | Feb. 9, 1937 |
| 2,182,124 | Guerra | Dec. 5, 1939 |
| 2,266,014 | Erickson | Dec. 16, 1941 |
| 2,356,649 | Bucher | Aug. 22, 1944 |
| 2,339,183 | Myers | Jan. 11, 1944 |
| 2,362,751 | Huck | Nov. 14, 1944 |
| 2,414,325 | Newell | Jan. 14, 1947 |